United States Patent [19]

Falvard

[11] Patent Number: 5,407,521

[45] Date of Patent: Apr. 18, 1995

[54] PLY TURN-UP DEVICE FOR TIRE BUILDING DRUM

[75] Inventor: Rene Falvard, Manzat, France

[73] Assignee: Compagnie Generale Des Etablissements Michelin Michelin & Cie, Clermont-Ferrand Cedex, France

[21] Appl. No.: 789,735

[22] Filed: Nov. 8, 1991

[30] Foreign Application Priority Data

Dec. 6, 1990 [FR] France .................. 90 15403

[51] Int. Cl.⁶ ............................. B29D 30/18
[52] U.S. Cl. ...................... 156/401; 156/400
[58] Field of Search ............ 156/400, 401, 402; 152/451, 457, 557

[56] References Cited

U.S. PATENT DOCUMENTS

| 3,044,533 | 7/1962 | Lowe . | |
|---|---|---|---|
| 3,677,318 | 7/1972 | Glass et al. | 152/557 |
| 3,776,293 | 12/1974 | Marzocchi | 152/557 |
| 3,855,678 | 12/1974 | Schroeder | 152/557 |
| 4,226,656 | 10/1980 | Appleby et al. . | |
| 4,278,484 | 7/1981 | McGaughey . | |
| 4,302,274 | 11/1981 | Enders . | |

FOREIGN PATENT DOCUMENTS 2194561  1/1974  France .

Primary Examiner—Michael W. Ball
Assistant Examiner—Richard Crispino
Attorney, Agent, or Firm—Brumbaugh, Graves, Donohue & Raymond

[57] ABSTRACT

The device comprises a ply turn-up bladder 1 capable of moving axially towards the center of the drum 3 in the manner of a caterpillar. It's movement is controlled by the inflation of a thrust bladder 2.

5 Claims, 4 Drawing Sheets

PLY TURN-UP DEVICE FOR TIRE BUILDING DRUM

BACKGROUND OF THE INVENTION

The present invention relates to tire building drums, and more particularly to a ply turn-up device for turning carcass plies around the bead wire.

In one well-known type of these devices, an inflatable bladder having the general shape of a torus is used. In order to assure the transverse displacement of these bladders, which displacement is necessary in order to effect the turning up, it is necessary to have recourse to an auxiliary element which effects a transverse push on the ply turn-up bladder. This auxiliary element is either a second inflatable bladder or else a metal ring which comes into contact with the turn-up bladder. One example of such a device is given in U.S. Pat. No. 3,698,987.

A ply turn-up bladder which by itself, solely under the effect of the increase in the inflation pressure, develops the rolling movement in the transverse direction which is necessary in order to effect the turning up of the carcass ply is also known. This ply turn-up bladder is described in U.S. Pat. No. 4,087,306.

The drawback of all of these known devices results from the size of their diameter, which is generally very great, to the extent of coming into collision with the passages for the placing of the carcass plies and other products brought onto the drum of the tire. This large diameter is particularly disturbing when the drum is moved from station to station in a tire manufacturing line.

Devices in which the rolling movement in the transverse direction results from the displacement of a metal ring arranged radially on the outside of the bladder are incompatible with the turning up of large lengths of carcass plies. All of the other known bladder devices in which the thrust is produced by another bladder or by the application of a laterally arranged mechanism cause, during their operation, a fanning of the carcass ply which is to be turned over. In fact, the carcass ply initially has a cylindrical configuration over its entire width, in particular between the bead wire and the side edge of the ply. Under the effect of the increase of pressure in the turn-up bladder, the edge of the carcass ply to be turned up, that is to say the part contained between the bead wire and the side end, lifts up gradually to pass through a stage where this carcass ply portion is arranged along a plane perpendicular to the axis of rotation. Thereupon, upon the rolling movement due to the thrust of the turn-up bladder, the carcass ply finally resumes a cylindrical shape. It will be noted that during the course of this movement the edge of the carcass ply suffers a very substantial elongation in circumferential direction, which elongation is greater the greater the transverse length of carcass ply to be turned up. This results in a stretching of the rubber calender-coating which is prejudicial to the quality of the tire.

The ply turn-up bladder in accordance with the teaching of U.S. Pat. No. 4,087,306 has, in addition, another drawback. It results from the fact that the turning-up movement due to the displacement of the bladder in the transverse direction commences at a very low inflation pressure of the bladder. When the inflation pressure is low, the force which the bladder is capable of developing on the carcass ply remains very low. In the case of metal carcass plies, it is insufficient to assure a uniform turning up at the base of the bead wire. When the turning up is effected, it is found that the carcass ply is not always properly applied against the products on which it is turned up, in particular in the vicinity of the bead wire where an empty space may remain.

All of the known turn-up bladders can be used only in order to turn up relatively short lengths of carcass plies. Now more and more frequently it is important to be able to effect ply turn ups of great length, sometimes up to 7 or 8 centimeters or even more.

SUMMARY OF THE INVENTION

The object of the present invention is to provide a ply turn-up device the principle of which is not subject to any limitation as to the length of the ply to be turned up. Another object of the invention is to propose a ply turn-up device which can operate with as small as possible a diameter, even for large lengths of plies to be turned up. An additional object of the invention is to be able to turn up carcass plies of substantial stiffness while assuring a rigorous and constant adherence of the carcass plies on the components of the tire around which it is turned, namely, the bead wire and the bead filler.

The turn-up device of the invention, which can be used with a tire building drum, comprises an inflatable annular turn-up bladder having a leading edge to be oriented from the side of the drum and means exerting a thrust on the turn-up bladder. It is characterized by the fact that the wall of the bladder has means which limit the radial expansion of the bladder to a maximum value, whatever the inflation pressure of the bladder, and by the fact that the means exerting the thrust are arranged radially below the bladder; these means which exert the thrust extend transversely from a level set back with respect to the leading edge to the end of the bladder opposite its leading edge, and the said thrust acts radially from the bottom towards the top in order, when the bladder has been inflated, to advance it towards the center of the drum.

In the embodiment illustrating the invention, the means for exerting thrust on the turn-up bladder include a second bladder, referred to as the thrust bladder, which acts radially on the turn-up bladder. However, a mechanical radial expansion system located at the same place would make it possible to obtain the same result.

DESCRIPTION OF THE DRAWINGS

The invention will be better understood from the following description, read with reference to the accompanying drawings in which.

DESCRIPTION OF PREFERRED EMBODIMENTS

Figure 1:
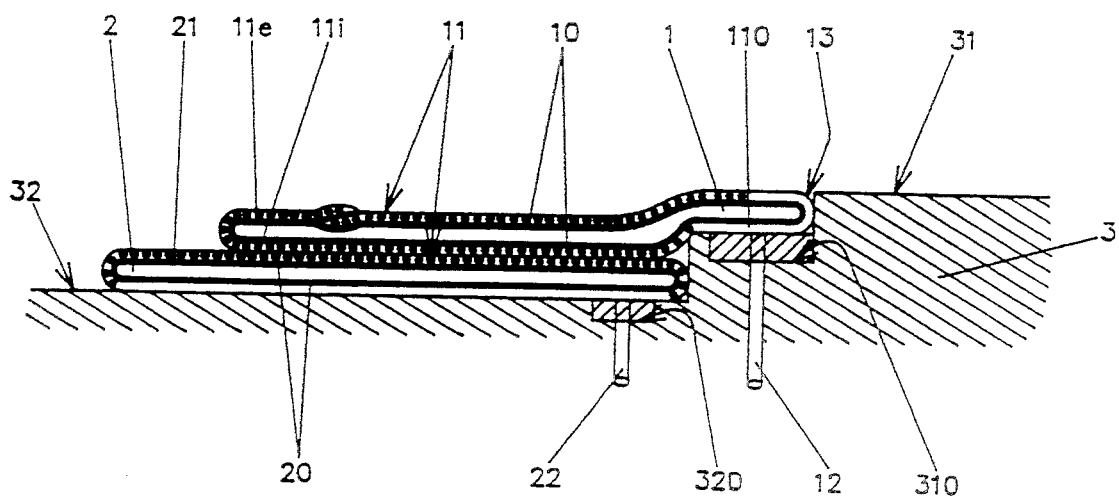
FIG. 1 is a radial cross section showing the construction of a ply turn-up device in accordance with the invention.
Figure 2:
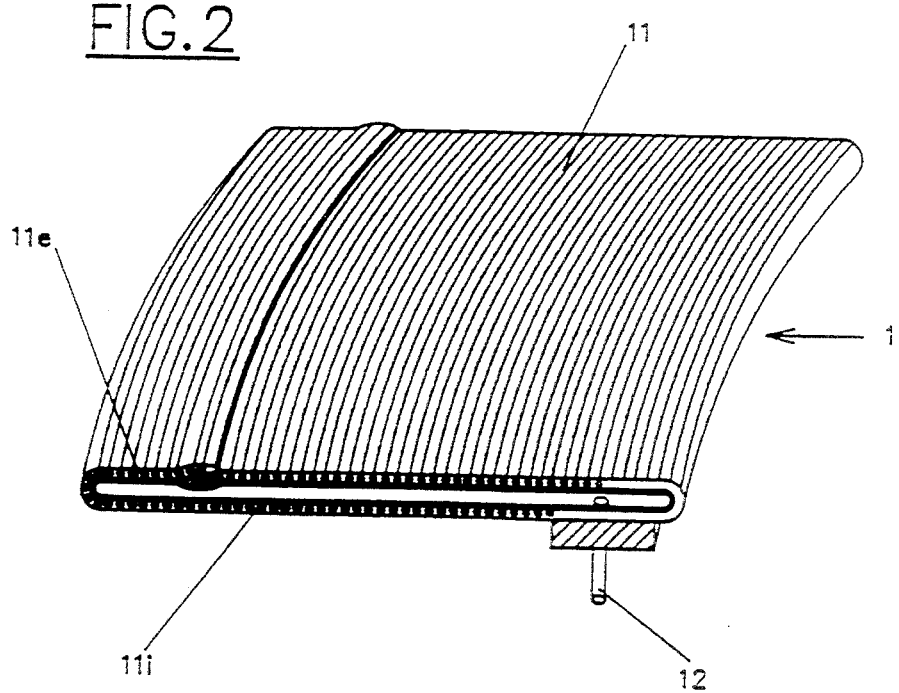
FIG. 2 is a perspective view which shows more particularly the construction of the turn-up bladder.

The bladders shown in FIGS. 1 and 2 are both formed of two reinforcement plies sandwiched between two layers of rubber. The two bladders, namely both the annular turn-up bladder 1 and the annular thrust bladder 2, are both carried on a cylindrical support of a rotatable building drum 3 of suitable diameter.

The bladders 1 and 2 are each reinforced by a ply 10, 20 of non-stretchable cords arranged at 90°. The angles are measured in the conventional manner for tires, namely with respect to a plane perpendicular to the axis of rotation of the building drum and, therefore, of the device. The radially outer wall 21 of the thrust bladder 2 as well as the entire wall 11 of the turn-up bladder 1 are reinforced by cords at 0° (with respect to a plane parallel to the axis of rotation of the drum) permitting a certain stretching of the wall in question and assuring a blocking of the shape assumed by the bladder when a selected circumferential development is reached. In the case of the turn-up bladder 1, only a small part 110 of the wall 11 corresponding to the zone of attachment on the frame 3 of the drum does not have to be reinforced by cords of 0°.

For this purpose, different types of reinforcement can be used. As in the example illustrating the invention, one can use cords having a brittle core. This is a type of cable comprising an inner core the purpose of which is to assure merely a support around which a certain number of strands assuring the function of resistance to elongation are helically wound, all impregnated with rubber. When this type of cable is stressed in tension, the core, formed of a material having low rupture characteristics, is broken under the effect of the tension and the cord is lengthened by an amount which is a function of the helix angle of the strands wound around the core, and a function also of the diameter of the core. This breaking of the core takes place upon the first inflation of the bladder. When the stressing terminates, this type of cord always returns to its initial length under the restoration effect produced by the surrounding rubber.

It is also possible to use undulated cords having, in stress-free state, the shape of a sinusoid, such as are used to produce protective plies for the crown of tires. Here also, when such cords are stressed in the direction of their length, they initially oppose practically no resistance to elongation as long as the undulations have not disappeared. When the elongation of the cable has caused the disappearance of the undulations, then a blocking effect appears and there is little or no further elongation of the cable, whatever the increase in the stressing in force.

A third type of cord which can be used to carry out this invention is a hybrid elastic cord formed of two different materials having very different characteristics of elongation and wound around a core so as to intervene sequentially as a function of the elongation of the cable. French Patent 2,283,968 shows an embodiment of such a hybrid cord. Here again, depending on the nature of the cord, it is possible to obtain a selected rate of initial elongation before obtaining a blocking of the length of the cord.

The radially outer wall 21 of the thrust bladder 2 is reinforced by cords with brittle core permitting an elongation of about 15%. As for the turn-up bladder 1, as a function of its transverse displacement, a point located in the inner wall 11$i$ in the initial configuration (FIGS. 1, 3 and 4) is capable of passing into the outer wall 11$e$, and vice versa. For this reason, the turn-up bladder 1 is reinforced practically entirely by the same cords of brittle core, permitting an elongation upon rupture on the order of 21%. It goes without saying that the values indicated are merely an example of an embodiment which gives excellent results, but they can, of course, be adapted as a function of the space available and of the dimensions and characteristics of the carcass plies to be turned up.

Figure 3:
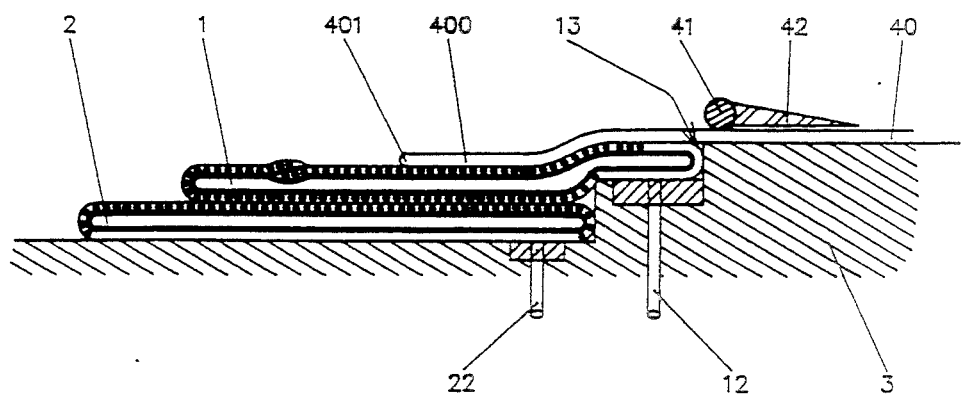
FIGS. 3 to 9 show the operation of the turn-up device of the invention, illustrating different phases of the operation.

The placing of the different bladders on a tire building drum is clearly evident from FIGS. 1 and 3 and following figures. There can be noted therein the frame 3 of the tire building drum which constitutes the support on which the different bladders are placed. The median zone 31 of the building drum constitutes a cylindrical support on which the tire will be progressively built up. At the side ends thereof, grooves 310 are provided to receive and fasten the turn-up bladder 1. The tube 12 permits the feeding thereof with inflation air. At a slightly lower radial level, the surface 32 makes it possible to place the thrust bladder 2 in a groove 320 provided for this purpose. The tube 22 permits the feeding of compressed air to the thrust bladder 2. As a variant, the two bladders 1 and 2 can constitute a single block fastened by the vulcanization to a common attachment zone which is fixed on the drum.

The median zone 31 and the turn-up bladder 1 together constitute a substantially cylindrical surface on which a carcass ply 40 is, first of all, placed. Thereupon the bead wire 41, as well as a bead filler 42, are positioned at the desired place. All these operations are clearly evident from FIG. 3.

Figure 4:
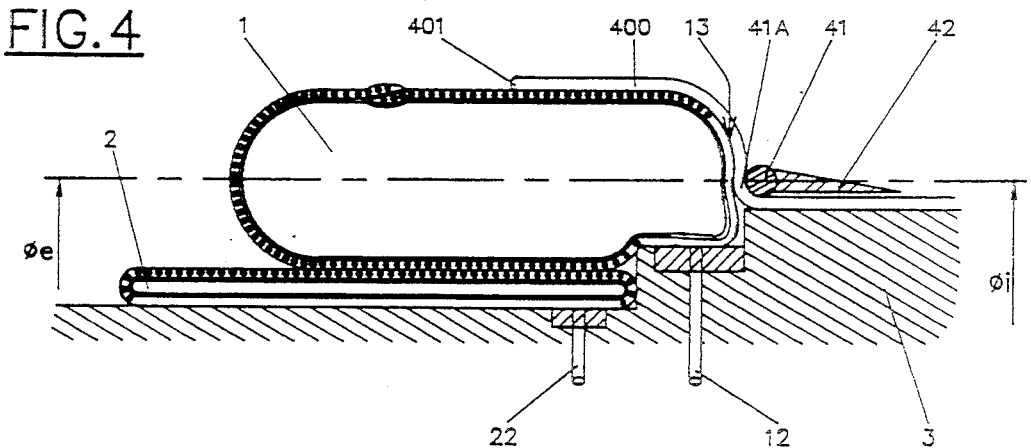

In FIG. 4 the action of the turn-up device commences. In an initial phase, the turn-up bladder 1 is inflated to its rated operating pressure, which may be relatively high, as high as necessary in order to assure intimate contact between the edge 400 of the carcass ply 40 which is to be turned around the bead wire and said bead wire. It is very important that the carcass ply 40 be very correctly applied and adhered to the bead wire 41 at the level of the zone identified by the reference number 41$a$ in FIG. 4. In the case of very stiff metal carcass plies, it may be necessary to be able to inflate the turn-up bladder 1 to a very high pressure before said bladder starts to effect the slightest transverse displacement. As long as the equator diameter $\phi_\iota$ on the side of the leading edge 13 of the turn-up bladder 1 is substantially equal to the equator diameter $\phi_c$ on the opposite side of the turn-up bladder (FIG. 4), the bladder does not develop any push in the transverse direction. The turning-up has, therefore, not started, and this constitutes an important feature of the invention. In order to assure the displacement of the turn-up bladder in the transverse direction, it is necessary to compress it from the bottom and on the side opposite the leading edge so that the equator diameter $\phi_c$ on this side is greater than the equator diameter $\phi_\iota$ on the leading-edge side. In the embodiment described, the thrust bladder 2 is used for this purpose.

Figure 5:
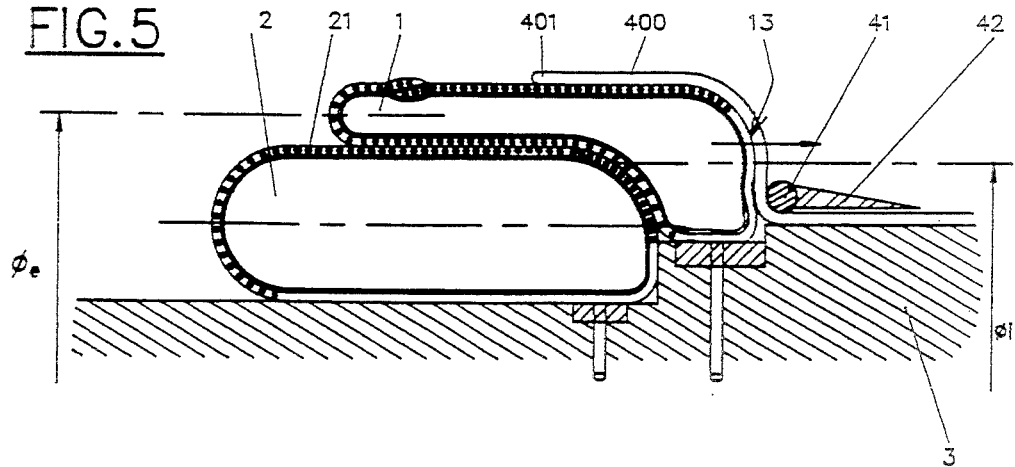

The second operation therefore consists in increasing the internal pressure of the thrust bladder 2. It is desirable that the radially outer wall 21 thereof retain a substantially cylindrical configuration. For this reason, this wall has been reinforced also by cords with brittle core which make it possible to control the shape of said wall 21. Under the effect of the increase in the inflation pressure of the thrust bladder, the turn-up bladder 1 assumes the shape shown in FIG. 5 and its transverse displacement towards the tire building drum actually commences as soon as the diameter $\phi_c$ is greater than the diameter $\phi_\iota$.

Figure 6:
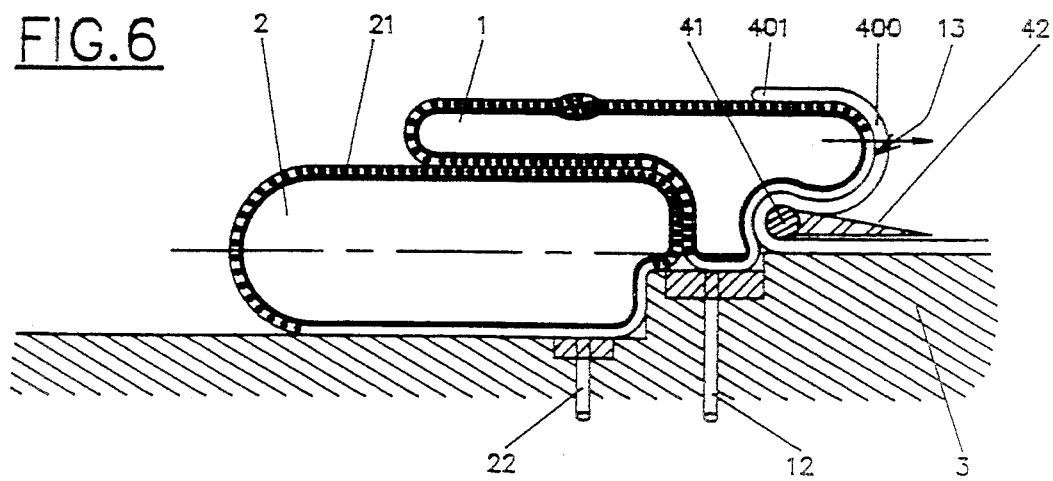
Figure 7:
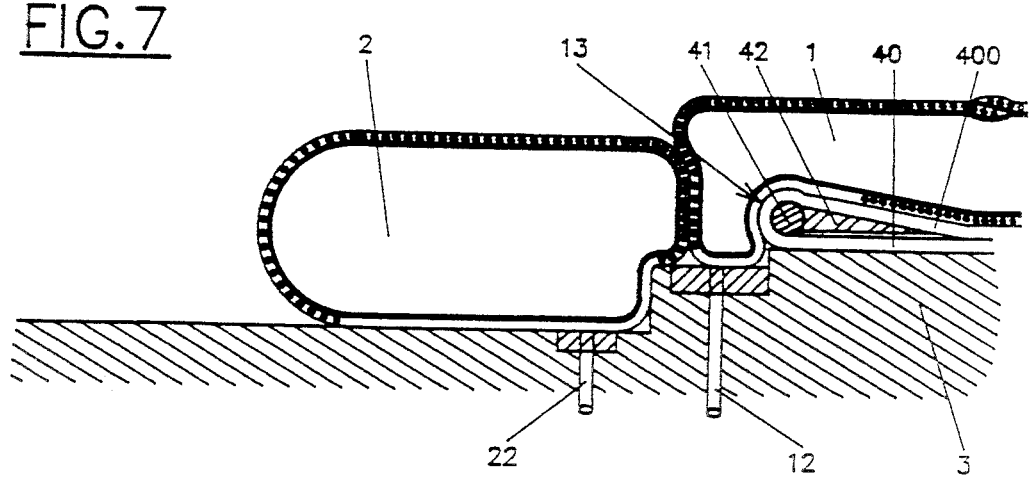

During this transverse displacement, the carcass ply has the shape of an S (see FIG. 6) which is progressively deformed, without the edge 401 of the part 400 to be turned up ever rising to a high diameter. The turn-up bladder 1 travels towards the center of the drum in the manner of a caterpillar. Due to this, the carcass ply is bent over by a true turning-up (FIG. 7).

Figure 8:
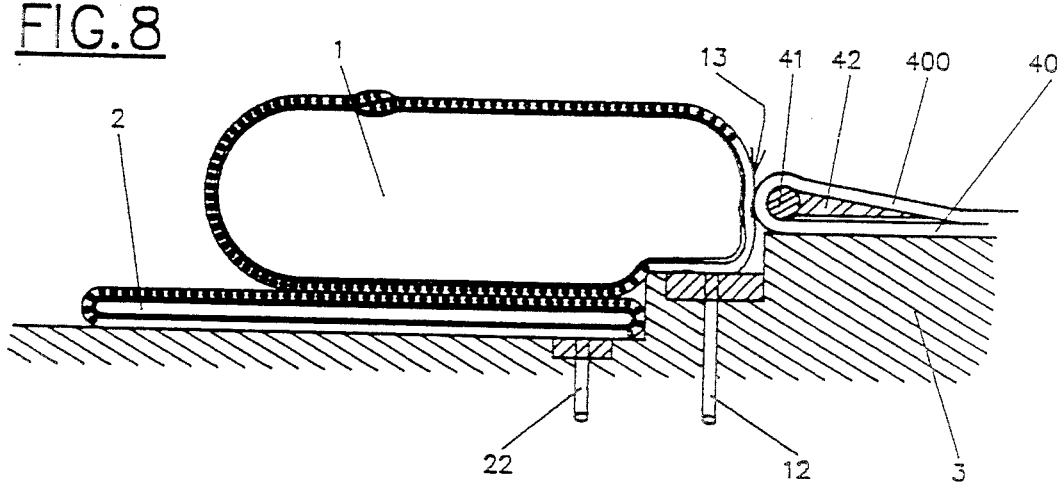
Figure 9:
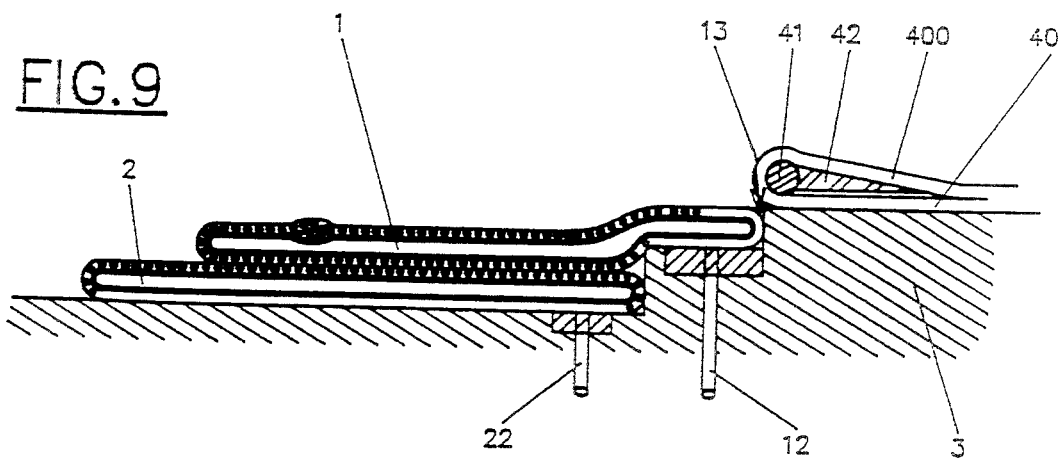

The opposite movement is obtained by first deflating the thrust bladder 2 (FIG. 8). Under the effect of the variations in equator diameter, the turn-up bladder 1 returns gradually to its initial position, even if the bending over is effected on a slope directed towards the middle of the drum, as is the case in the example illustrating the invention, where the median zone is located at a smaller diameter than the radially outer diameter of the bead wires. The turn-up bladder is then deflated in order to return the device to the initial conditions (FIG. 9).

Various adaptations can easily be contemplated without thereby going beyond the scope of the present invention. For example, if one has only a single pneumatic control reserved on the drum for the operation of the ply turn-up device, one can very easily incorporate a delay device in the drum itself so that the thrust bladder 2 is always inflated after the turn-up bladder 1 and that the thrust bladder 2 is always deflated before the turn-up bladder 1.

Or else one can adapt such a turn-up device to other stages of the manufacture of the tires, for instance, for the sheathing of the bead wires or else for folding crown plies on themselves on other crown plies, which is a problem well know to those skilled in the art. Thus, the expression "drum" is to be understood in a very broad sense, as covering any support which makes it possible to receive a constituent around which something is to be turned up: a coating rubber, or a ply, whether or not reinforced with cords. The essential means of the invention are the use, in the manner explained, of a turn-up bladder which is clamped in maximum diameter and on which a thrust means acts to modify as desired the value of the equator diameters $\phi_t$ and $\phi_c$.

I claim:

1. A ply turn-up device for a tire building drum having an axis of rotation, said device comprising an annular turn-up bladder carried by the drum, said turn-up bladder having a wall with upper and lower cylindrical portions and a leading edge which is accommodated on the drum beneath the end of a length of carcass ply to be turned up, annular reinforcement cords in the wall of the turn-up bladder arranged at an angle of 0° with respect to a plane perpendicular to the axis of the drum for limiting radial expansion during the inflation of the turn-up bladder when a maximum expansion has been reached and irrespective of further increase in the inflation pressure, the reinforcing cords being arranged in both the upper and lower cylindrical portions, means on the drum beneath the turn-up bladder for exerting a radial outward thrust on the turn-up bladder, said thrust exerting means extending transversely from a position set back with respect to the leading edge of the turn-up bladder to the end of the bladder opposite the leading edge, the thrust being exerted by said thrust exerting means radially from the bottom towards the top in order, when the turn-up bladder has been inflated, to cause the advance of the leading edge toward the center of the drum to turn up the ply and to cause the displacement of the reinforcement cords in the upper wall portion in the direction of the center of the drum while maintaining the upper wall portion cylindrical during the turn up of the ply.

2. A device according to claim 1, characterized by the fact that the reinforcement cords are selected from the group consisting of undulated cords, brittle-core cords or hybrid cords.

3. A device according to claim 1, characterized by the fact that the said thrust exerting means are formed of a second inflatable bladder.

4. A device according to claim 3, characterized by the fact that the second bladder is reinforced by cords of 0° which oppose any additional elongation when a selected maximum development has been reached, they being arranged in the radially outer wall of the second bladder.

5. A device according to claim 4, characterized by the fact that the reinforcement cords are selected from the group consisting of undulated cords, brittle-core cords or hybrid cords.

* * * * *

UNITED STATES PATENT AND TRADEMARK OFFICE
CERTIFICATE OF CORRECTION

PATENT NO. : 5,407,521
DATED : Apr. 18, 1995
INVENTOR(S) : Falvard

It is certified that error appears in the above-indentified patent and that said Letters Patent is hereby corrected as shown below:

Col. 4, lines 41, 49 and 63, and Col. 5, line 38,

"$\phi_c$" should read --$\phi_e$--.

Signed and Sealed this

Fourth Day of July, 1995

Attest:

BRUCE LEHMAN

Attesting Officer     Commissioner of Patents and Trademarks